UNITED STATES PATENT OFFICE.

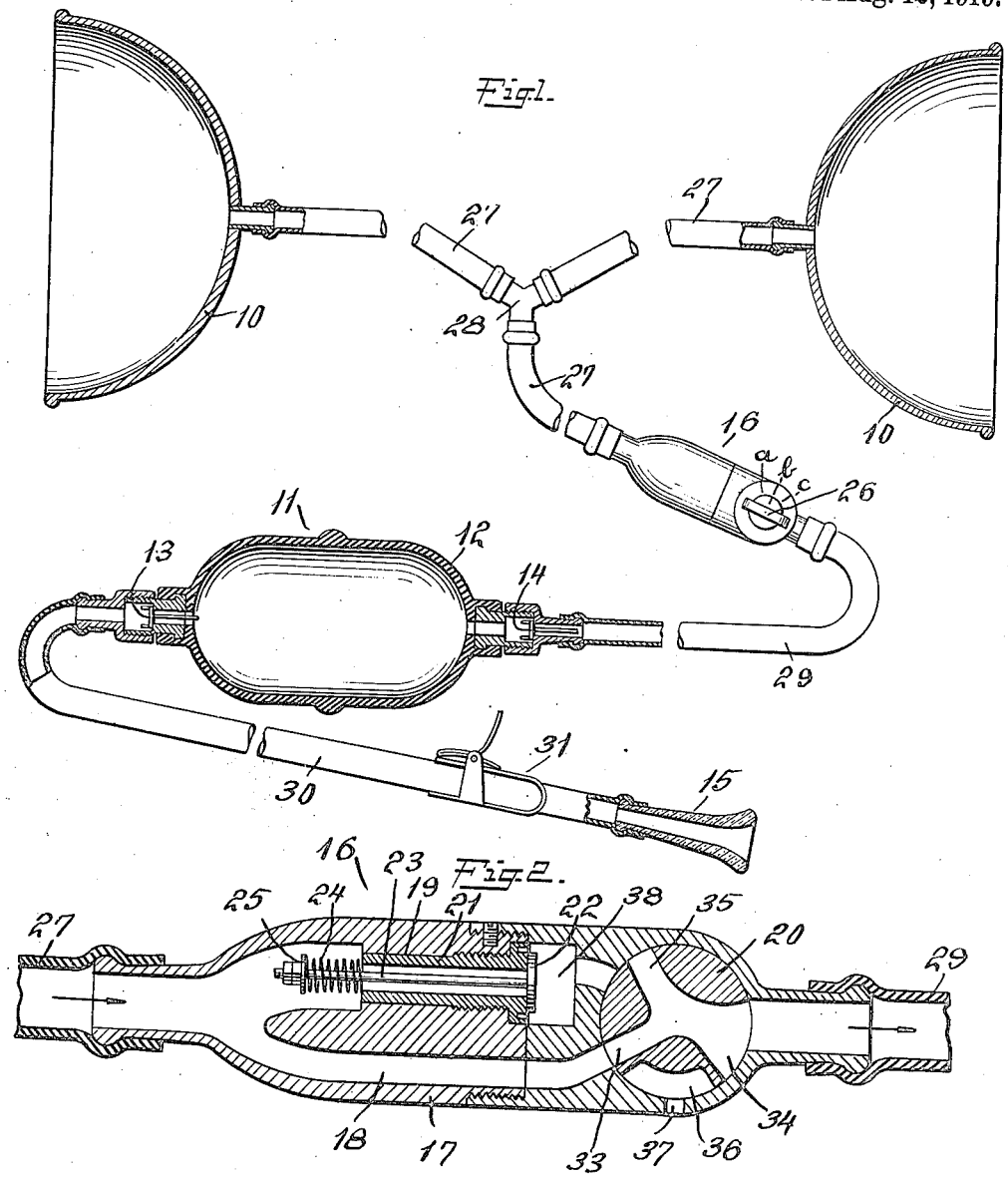

ISABEL D'ORSAY, OF NEW YORK, N. Y.

APPARATUS FOR TREATING PARTS OF THE HUMAN BODY.

1,312,619. Specification of Letters Patent. Patented Aug. 12, 1919.

Application filed August 25, 1916. Serial No. 116,798.

*To all whom it may concern:*

Be it known that I, ISABEL D'ORSAY, a citizen of the United States of America, and a resident of New York, county and State of New York, have invented certain new and useful Improvements in Apparatus for Treating Parts of the Human Body, of which the following is a specification, reference being had to the accompanying drawings, forming a part thereof.

My invention relates to massage apparatus for treating parts of the human body and has special reference to such as is adapted for the development of the bust.

One object of my invention is to provide a simple and effective apparatus that shall be particularly light in weight and delicate in its action.

Another object is to provide apparatus for the aforesaid purpose that shall embody means for varying the action of the mechanism, so that although actuated in the same way either a gradual vacuum or a pulsating suction may be produced.

Another object is to provide for readily starting the action of the apparatus by holding it lightly in contact with the body until it is adjusted to its proper position.

In order that my invention may be thoroughly understood I will now proceed to describe the same in the following specification, and then point out the novel features thereof in appended claims.

Referring to the drawings:

Figure 1 is a partially sectional view of an apparatus which is constructed in accordance with and constitutes an embodiment of my invention.

Fig. 2 is a longitudinal section of the control valve of Fig. 1 drawn to a larger scale.

In the drawings, 10 designates the cups or vacuum applicators which are intended to be applied to the parts of the body to be treated, the cups as illustrated being particularly adapted to be placed over the breasts for the purpose of developing the bust.

The cups may be formed of any suitable material such as aluminum.

Connected to the cups 10 is a pump 11 which comprises a bulb 12 and has the usual check valves 13 and 14 at its respective ends. It is connected at its outlet end to a mouth-piece 15 which is preferably formed of glass.

A control valve 16 is interposed between the pump 11 and the cups and comprises a tubular housing 17 having an open passage or duct 18, a pulsation passage 19, and a valve cylinder 20. In the pulsation passage 19 is a bushing 21 and a valve 22 having a stem 23 which extends through the passage and a spring 24 interposed between the receiving end of the bushing 19 and an enlargement or collar 25 near the outer end of the stem.

The enlargement may conveniently be formed by providing a couple of nuts and a washer as shown in Fig. 2, thereby permitting a ready adjustment of the nuts to determine the spring tension.

The valve cylinder 20 has a handle 26 and is adapted to occupy any one of three positions designated *a*, *b* and *c* in Fig. 1.

The cups 10 are connected to the control valves 16 by flexible tubes 27 and a Y-shaped connection 28, and the valve 16 is connected to the pump 11 and the pump to the mouth-piece 15 by flexible tubes 29 and 30 respectively.

A clip 31 of well known form is preferably mounted on the tube 30.

A control valve 16 as shown in Figs. 1, and 2, occupies the position *b*, and in this position an open connection is established through the passage 18 and the branches 33 and 34 of the valve cylinder. If the handle 26 is adjusted to the position *a* the connection is established through the pulsation passage 19 in which the valve 22 is located, and branches 35 and 34 of the valve cylinder. In position *c* a connection is established from passage 18 through a duct 36 of the control cylinder to an exhaust port 37.

Assuming that the valve occupies the position *b* as shown in the drawings, the apparatus is used as follows: the cups 10 are applied to the parts of the body to be treated, as, for example, to the breasts if the apparatus is used for bust development. The air is slightly exhausted by drawing air through the mouth piece 15, after which the clip 31 is set to prevent the air from returning.

The cups now cling slightly to the body but may be readily adjusted into the position desired. The clip 31 is next released and the pump 11 operated by pressing the bulb 12 in a well known manner. The valves 13 and 14 are of course alternately opened and closed and prevent the air from flowing back.

The pump of course extracts very small quantity of air each time the bulb is compressed, so that the vacuum is very gradually produced in the cups 10, provided the control valve occupies the position b as above assumed.

If, however, it is desired to produce a pulsating effect for the purpose of increasing the effectiveness of the apparatus, the valve may be adjusted to position a, connection being then established as already explained, through the pulsation duct 19 in which the valve 22 is located.

If, under these conditions, the pump is actuated, the air is exhausted from the chamber 38 until the difference in air pressure on opposite sides of the valve 22 is sufficiently great to compress the spring 24 and momentarily open the valve.

The tension of the spring 24 may be adjusted, as already explained, and the valve and spring are adapted to produce a marked pulsating effect in the cups, a considerable number of strokes or impulses of the pump being necessary for each pulsation of air through the valve 22.

The use of an intermittently acting pump, such as the bulb pump 11, is an essential feature of my invention because, if a continuously acting pump were employed it would produce a substantially constant flow of air through the valve 22 which would hold it open and make it impossible to secure the periodic impulses at the cups which I have conveniently termed a pulsation suction and which is one of the objective results of my invention.

When it is desired to stop the treatment and remove the apparatus, the valve is thrown into the position c in which the exhaust connection is established as already explained. The valve may be moved slowly into position c so as to admit the air gradually if desired.

The use of the clip 31 is not essential since the valves 30 and 14 tend to prevent the return of the air to the cups but the difference in pressure produced by drawing of air through the mouth piece at the start may be very slight and might not be sufficient to hold the valves closed. The clip of course is not depended upon in connection with the actuation of the pump since the valves 13 and 14 hold the pressure in the usual manner.

It is evident that my apparatus may be utilized for various purposes and the vacuum applicator or cup may have any suitable form and one or more of them may be utilized. I therefore intend that only such limitations be imposed as are indicated in the appended claims.

What I claim is:

1. Apparatus for the treatment of the body comprising a pair of vacuum applicators adapted to be adjusted by the hands of the user, an exhaust pump, a mouth piece connected to the exhaust end of the pump, and auxiliary means for holding the vacuum.

2. Apparatus for the treatment of the body comprising a vacuum applicator, an exhaust pump, a mouth piece, a flexible tube connection between the exhaust end of the pump and the mouth piece, and a clip on the flexible tube for holding the vacuum whereby the apparatus may be initially fastened in position by sucking the air through the mouth piece.

3. Apparatus for the treatment of the body comprising a vacuum applicator, an exhaust pump and an interposed control valve comprising an open duct, a pulsation duct, a valve member adapted to be turned to establish connection through one or the other of said ducts, and an exhaust port adapted to be governed by the same valve.

4. Apparatus for treatment of the body comprising a vacuum applicator, an intermittently acting or pulsatory exhaust pump adapted to exhaust air from the vacuum applicator, and automatic means dependent upon the intermittent action of the exhaust pump for periodically interrupting or intercepting the exhaustion to produce a series of impulses at the applicator.

5. Apparatus for treatment of the body comprising a vacuum applicator, an intermittently acting or pulsatory exhaust pump adapted to slowly exhaust air from the vacuum applicator, and automatic means dependent upon a predetermined difference in air pressure on opposite sides thereof and dependent upon the intermittent action of the exhaust pump for interrupting or intercepting the exhaustion to produce a pulsating suction at the applicator.

6. Apparatus for treatment of the body comprising a vacuum applicator, an intermittently acting or pulsatory exhaust pump adapted to be actuated by the operator to vary at will the rate of exhaustion of air from the vacuum applicator, and interposed automatic means dependent upon a predetermined difference in air pressure on opposite sides thereof and dependent upon the intermittent action of the exhaust pump for interrupting or intercepting the exhaustion to produce a pulsating suction at the applicator.

7. Apparatus for treatment of the body comprising a vacuum applicator, an intermittently acting or pulsatory exhaust pump adapted to slowly exhaust air from the vacuum applicator, automatic means dependent upon the intermittent action of the exhaust pump for periodically interrupting or intercepting the exhaustion to produce a series of impulses at the applicator, and means for selectively establishing the connection between the vacuum applicator and the exhaust pump independently of said interrupting or intercepting means.

8. Apparatus for treatment of the body comprising a vacuum applicator, an intermittently acting or pulsatory exhaust pump and an interposed control valve comprising an open duct, a pulsation duct including automatic means for periodically interrupting or intercepting the exhaustion to produce a pulsating suction at the applicator, and a valve member adapted to be turned to establish connection through one or the other of said ducts.

9. Apparatus for treatment of the body comprising a vacuum applicator, an intermittently acting or pulsatory exhaust pump and an interposed control valve comprising an open duct, a pulsation duct having a spring-pressed valve therein; and a valve member adapted to be turned to establish connection through one or the other of said ducts.

10. Apparatus for treatment of the body comprising a vacuum applicator, an intermittently acting or pulsatory exhaust pump and an interposed control valve comprising an open duct, a pulsation duct having a spring-pressed valve therein and means for adjusting the spring tension; and a valve member adapted to be turned to establish connection through one or the other of said ducts.

In witness whereof, I have hereunto set my hand this 24th day of August, 1916.

ISABEL D'ORSAY.